US011126812B2

(12) United States Patent
Hung et al.

(10) Patent No.: US 11,126,812 B2
(45) Date of Patent: Sep. 21, 2021

(54) FINGERPRINT SENSOR

(71) Applicants: Egis Technology Inc., Taipei (TW); Igistec Co., Ltd., Hsinchu County (TW)

(72) Inventors: Ching-Ho Hung, Hsinchu County (TW); Chung-Yi Wang, Hsinchu County (TW)

(73) Assignees: Egis Technology Inc., Hsinchu (TW); Igistec Co., Ltd., Hsinchu (TW)

( * ) Notice: Subject to any disclaimer, the term of this patent is extended or adjusted under 35 U.S.C. 154(b) by 0 days.

(21) Appl. No.: 16/809,568

(22) Filed: Mar. 5, 2020

(65) Prior Publication Data

US 2020/0364438 A1    Nov. 19, 2020

Related U.S. Application Data

(60) Provisional application No. 62/848,587, filed on May 16, 2019.

(30) Foreign Application Priority Data

Jan. 15, 2020    (CN) .......................... 202010040545.0

(51) Int. Cl.
*G06K 9/00* (2006.01)

(52) U.S. Cl.
CPC ....... *G06K 9/00013* (2013.01); *G06K 9/0004* (2013.01)

(58) Field of Classification Search
CPC ......... G06K 9/00006–0012; G06K 2009/0006
See application file for complete search history.

(56) References Cited

U.S. PATENT DOCUMENTS

| 7,622,699 | B2 | 11/2009 | Sakakibara et al. |
|---|---|---|---|
| 9,891,746 | B2 * | 2/2018 | Bae ...................... G06K 9/0014 |
| 10,216,341 | B2 * | 2/2019 | Ding ................... G06F 3/04166 |
| 10,318,788 | B2 * | 6/2019 | Wang ...................... G06K 9/209 |
| 10,372,960 | B2 * | 8/2019 | Wang ................... G06K 9/0002 |
| 10,762,833 | B2 * | 9/2020 | Wang ....................... G09G 3/32 |
| 10,796,126 | B2 * | 10/2020 | Lin ....................... G06K 9/0002 |
| 10,824,836 | B2 * | 11/2020 | Lin ........................ G06F 3/0416 |
| 2004/0140735 | A1 * | 7/2004 | Scott .................. G06K 9/00885 310/328 |
| 2010/0321356 | A1 * | 12/2010 | Brown ............. H01L 27/14643 345/207 |
| 2016/0132176 | A1 * | 5/2016 | Bae ......................... G06F 3/042 345/174 |

(Continued)

FOREIGN PATENT DOCUMENTS

| CN | 109710112 | 5/2019 |
|---|---|---|
| TW | I578301 | 4/2017 |
| TW | I654551 | 3/2019 |

*Primary Examiner* — Patrick F Marinelli
(74) *Attorney, Agent, or Firm* — JCIPRNET (57) ABSTRACT

The invention provides a fingerprint sensor including a sensing array. The sensing array includes a plurality of sensing units to form a plurality of sensing regions arranged in an array. Each of the plurality of sensing regions includes at least one column of sensing units. A first part of the plurality of sensing regions receives a power signal to perform fingerprint sensing. A second part of the plurality of sensing regions does not receive a power signal. Therefore, the fingerprint sensor of the invention can provide a fast and energy-saving large-area fingerprint sensing effect.

6 Claims, 5 Drawing Sheets

(56) References Cited

U.S. PATENT DOCUMENTS

| | | | |
|---|---|---|---|
| 2017/0005508 A1* | 1/2017 | Utsunomiya | G06F 3/03543 |
| 2017/0115769 A1* | 4/2017 | Ding | G06F 3/0412 |
| 2017/0116452 A1* | 4/2017 | Wang | G06K 9/0002 |
| 2018/0255280 A1* | 9/2018 | Gutierrez | G01S 7/4816 |
| 2018/0300527 A1* | 10/2018 | Wang | G06K 9/0004 |
| 2019/0188440 A1* | 6/2019 | Lin | G06F 3/0416 |
| 2019/0250031 A1* | 8/2019 | Ding | G01J 1/44 |
| 2020/0051494 A1* | 2/2020 | Wang | G09G 3/3233 |
| 2020/0104561 A1* | 4/2020 | Wang | G06K 9/0002 |
| 2020/0134277 A1* | 4/2020 | Lin | G06F 3/0416 |
| 2020/0279086 A1* | 9/2020 | Wang | G06K 9/0008 |
| 2020/0334435 A1* | 10/2020 | Hung | G06K 9/0004 |
| 2020/0364438 A1* | 11/2020 | Hung | G06K 9/00013 |
| 2020/0410203 A1* | 12/2020 | Chang | G06K 9/00013 |

* cited by examiner

FINGERPRINT SENSOR

CROSS-REFERENCE TO RELATED APPLICATION

This application claims the priority benefits of U.S. provisional application Ser. No. 62/848,587, filed on May 16, 2019, and China application serial no. 202010040545.0, filed on Jan. 15, 2020. The entirety of each of the above-mentioned patent applications is hereby incorporated by reference herein and made a part of this specification.

BACKGROUND

Technical Field

The disclosure relates to a sensor, and in particular to, a fingerprint sensor.

Description of Related Art

In a conventional large-area fingerprint sensor, in each fingerprint sensing operation, the conventional fingerprint sensor needs to drive all sensing units on the sensing array to perform sensing, so the conventional fingerprint sensor needs to spend more time to perform fingerprint sensing. Besides, in each fingerprint sensing operation, the conventional fingerprint sensor also needs to read out sensing results of a plurality of sensing units through a multiplexer (MUX) in a time-sharing manner, so the conventional fingerprint sensor also has the problem of poor image acquisition efficiency. In view of this, solutions of several embodiments will be provided below.

SUMMARY

The invention is directed to a fingerprint sensor that can provide a fast and energy-saving large-area fingerprint sensing effect.

According to embodiments of the invention, the fingerprint sensor of the invention includes a sensing array. The sensing array includes a plurality of sensing units to form a plurality of sensing regions arranged in an array. Each of the plurality of sensing regions includes at least one column of sensing units. A first part of the plurality of sensing regions receives a power signal to perform fingerprint sensing. A second part of the plurality of sensing regions does not receive a power signal.

Based on the above, the fingerprint sensor of the invention can perform fingerprint sensing by providing the power signal to a part of the plurality of sensing regions of the sensing array corresponding to the sensing units in the current fingerprint sensing region, and other parts of the plurality of sensing regions of the sensing array that do not perform fingerprint sensing do not receive a fingerprint signal. Therefore, the fingerprint sensor of the invention can provide a fast and energy-saving large-area fingerprint sensing effect.

To make the features and advantages of the invention clear and easy to understand, the following gives a detailed description of embodiments with reference to accompanying drawings.

BRIEF DESCRIPTION OF THE DRAWINGS

The accompanying drawings are included to provide a further understanding of the invention, and are incorporated in and constitute a part of this specification. The accompanying drawings are included to provide a further understanding of the invention, and are incorporated in and constitute a part of this specification.

DESCRIPTION OF THE EMBODIMENTS

Exemplary embodiments of the invention are described in detail, and examples of the exemplary embodiments are shown in the accompanying drawings. Whenever possible, the same component symbols are used in the drawings and descriptions to indicate the same or similar parts.

Figure 1:
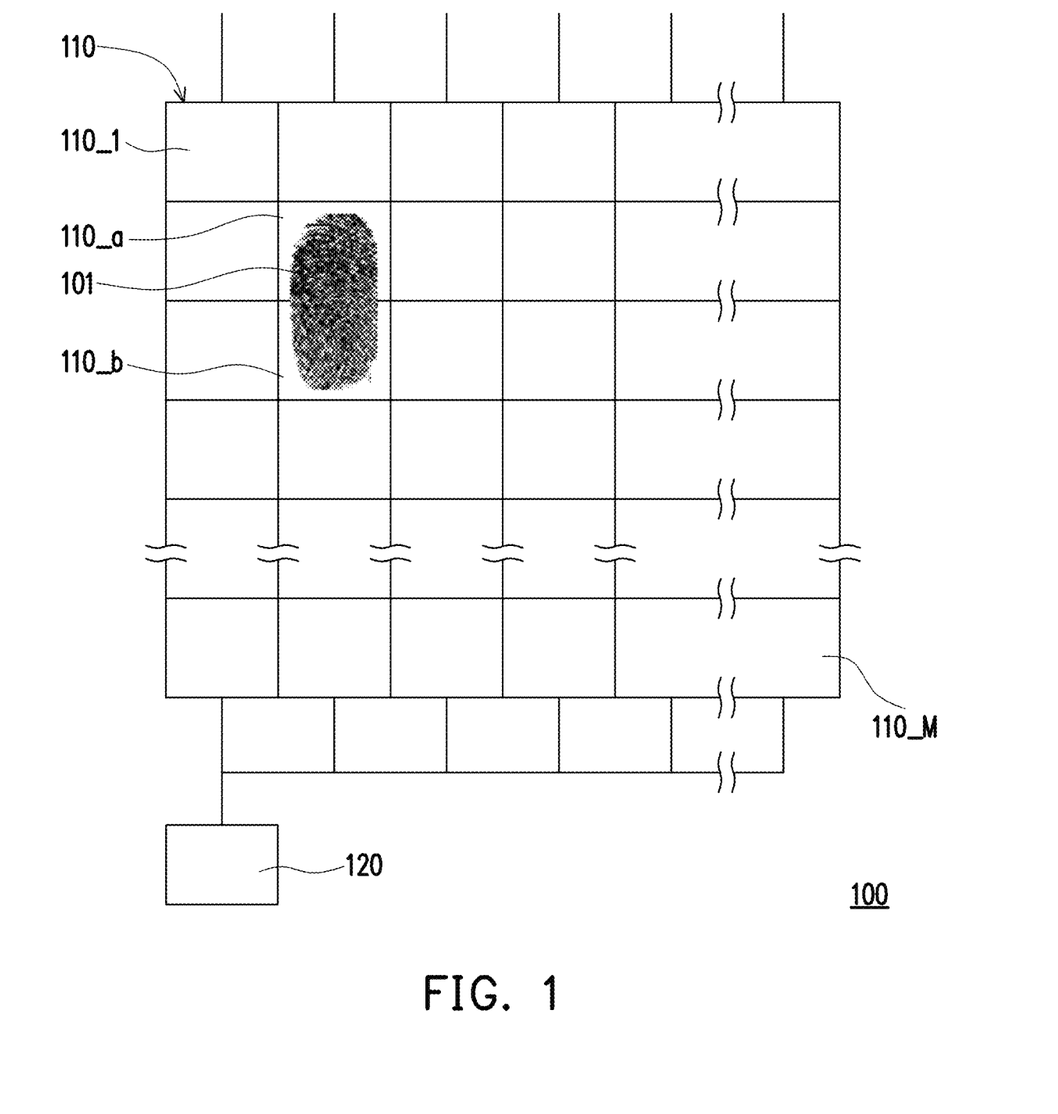
FIG. 1 shows a schematic diagram of a fingerprint sensor according to an embodiment of the invention.

FIG. 1 shows a schematic diagram of a fingerprint sensor according to an embodiment of the invention. With reference to FIG. 1, a fingerprint sensor 100 is an optical sensor capable of providing a large-area sensing range, and may be used for in-screen fingerprint recognition, for example, but the invention is not limited thereto. The fingerprint sensor 100 includes a sensing array 110 and a readout circuit 120. The sensing array 110 includes a plurality of sensing regions 110_1-110_M arranged in an array formed by a plurality of sensing units, and each of the sensing regions 110_1-110_M includes at least one column of sensing units. M is a positive integer greater than 1. The fingerprint sensor 100 may illuminate a finger through a self-luminous display panel or an additional illuminating component, and sense reflected light with fingerprint information reflected by the finger through the sensing array 110. In the present embodiment, the size of a sensing area that is provided by the sensing array 110 is much larger than the size of a corresponding single fingerprint area when a single finger of a user is pressed on the fingerprint sensor 100.

In the present embodiment, when the finger of the user is, for example, pressed and covered on sensing regions 110_a and 110_b, the sensing regions 110_a and 110_b will receive a power signal to perform fingerprint sensing, where a and b are integers between 1 and M. In such cases, the other sensing regions will not receive a power signal. It is worth noting that the fingerprint sensor 100 may, for example, determine a sensing region object to receive the power signal to perform fingerprint sensing according to the touch point reporting from a touch panel, but the invention is not limited thereto. In other words, when the fingerprint sensor 100 performs fingerprint sensing, the readout circuit 120 only needs to read out sensing signals of the sensing regions 110_a and 110_b to a back-end arithmetic unit. In this regard, since the fingerprint sensor 100 of the present embodiment does not need to drive the overall sensing array 110 and does not need to read out the sensing signal of each sensing region, the fingerprint sensor 100 of the present embodiment can effectively shorten the fingerprint sensing time and can increase the speed of acquiring a fingerprint image.

In addition, the fingerprint sensor 100 of the present embodiment may further include other necessary circuit components, for example, a digital signal processor (DSP), an analog-to-digital converter (ADC), or an analog front end (AFE) circuit, but the invention is not limited thereto.

Figure 2:
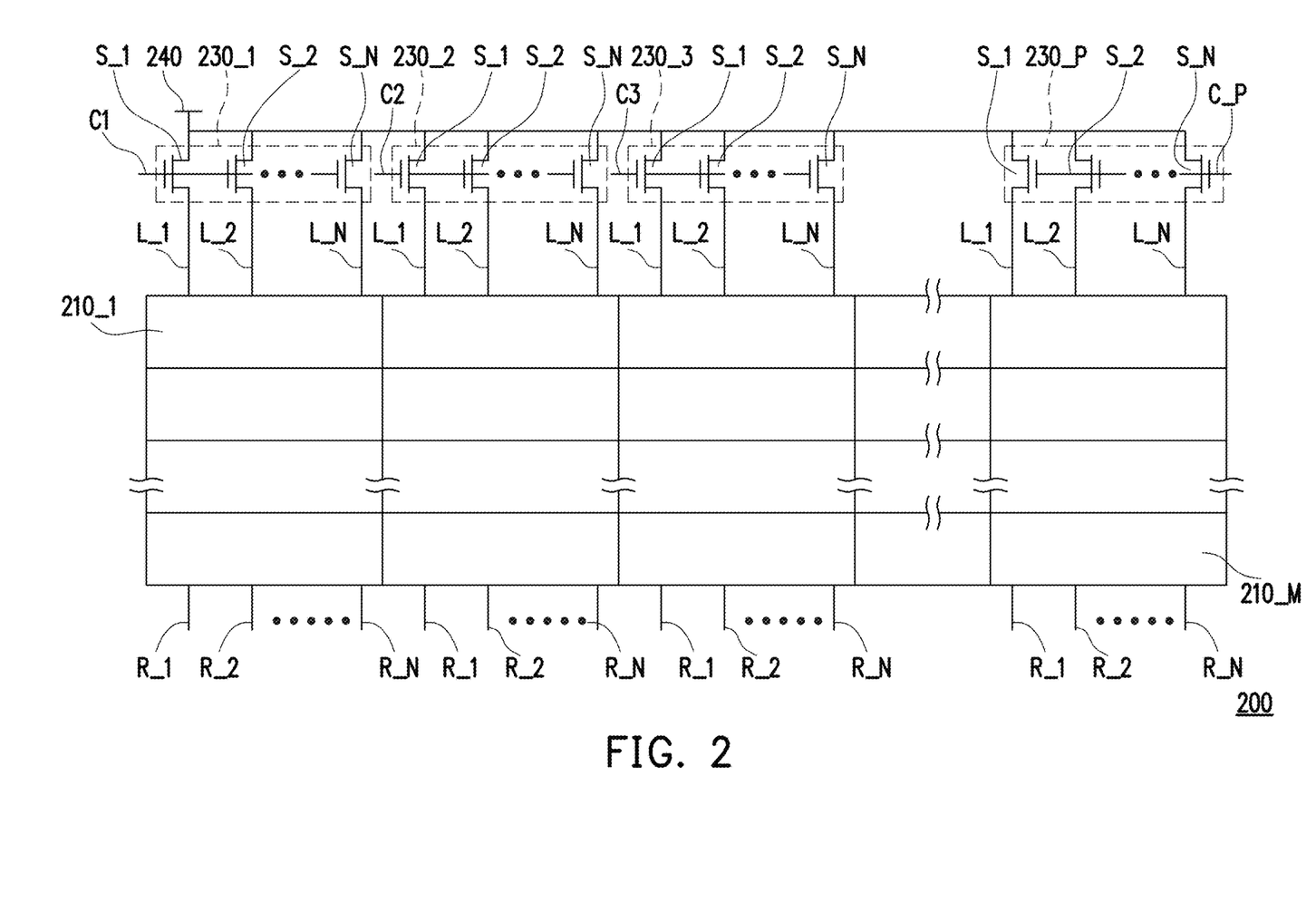
FIG. 2 shows a driving schematic diagram of a sensing array according to a first embodiment of the invention.

FIG. 2 shows a driving schematic diagram of a sensing array according to a first embodiment of the invention. With reference to FIG. 2, a fingerprint sensor 200 includes a sensing array 210 and a plurality of switch circuits 230_1-230_P. P is a positive integer greater than 1. The sensing array 210 includes a plurality of sensing regions 210_1-210_M arranged in an array formed by a plurality of sensing units, and each column of the sensing regions are coupled to a readout circuit (not shown) via signal readout lines R_1-R_N. In the present embodiment, the switch circuits 230_1-230_P are respectively coupled between the corresponding sensing regions and a power input terminal 240, and respectively receive corresponding control signals C_1-C_P. Each of the switch circuits 230_1-230_P includes switch components S_1-S_N. N is a positive integer equal to or greater than 1. In the present embodiment, the switch components S_1-S_N of each of the switch circuits 230_1-230_P are coupled in a one-to-one manner between the at least one column of corresponding sensing units in the corresponding sensing region and the power input terminal 240 via corresponding power lines L_1-L_N, and a plurality of switch components of a same switch circuit receive a same signal.

In other words, the fingerprint sensor 200 may selectively turn on the corresponding switch components S_1-S_N of the switch circuits 230_1-230_P through the control signals C_1-C_P according to the sensing regions where the finger is located, thereby providing a power signal to the sensing regions where the finger is located (for example, a part of the sensing regions 210_1-210_M) to perform fingerprint sensing. Therefore, the fingerprint sensor 200 of the present embodiment can selectively drive only the plurality of sensing units in partial and necessary sensing regions to perform fingerprint sensing, and therefore, can effectively shorten the fingerprint sensing time and can increase the speed of acquiring a fingerprint image.

Figure 3:
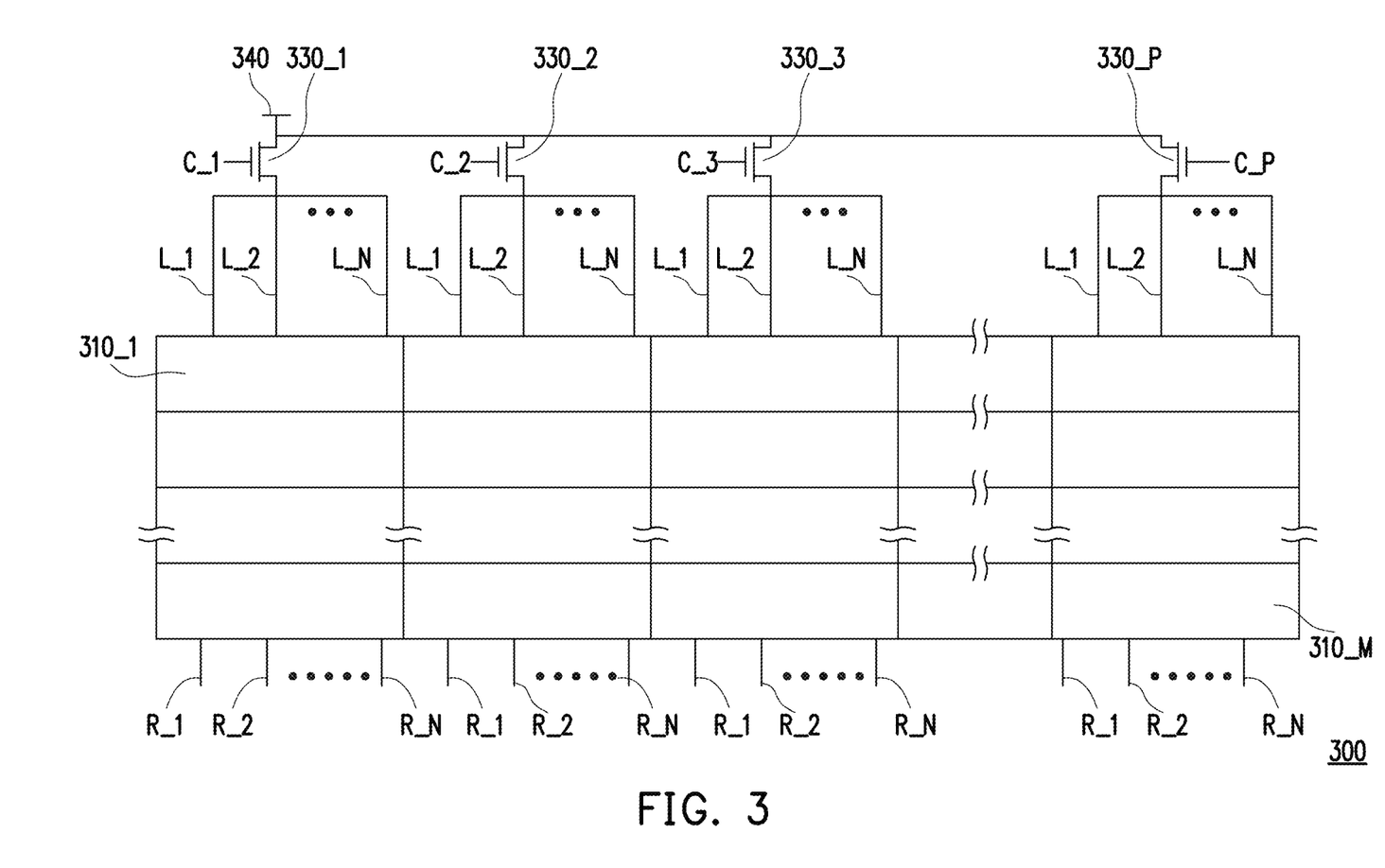
FIG. 3 shows a driving schematic diagram of a sensing array according to a second embodiment of the invention.

FIG. 3 shows a driving schematic diagram of a sensing array according to a second embodiment of the invention. With reference to FIG. 3, a fingerprint sensor 300 includes a sensing array 310 and a plurality of switch circuits 330_1-330_P. Each of the switch circuit 330_1-330_P is a switch component. The sensing array 310 includes a plurality of sensing regions 310_1-310_M arranged in an array formed by a plurality of sensing units, and each column of the sensing regions are coupled to a readout circuit (not shown) via signal readout lines R_1-R_N. In the present embodiment, the switch circuits 330_1-330_P are respectively coupled between the corresponding sensing regions and a power input terminal 240, and respectively receive corresponding control signals C_1-C_P. In the present embodiment, the switch component of each of the switch circuits 330_1-330_P is coupled in a one-to-many manner between the plurality of columns of corresponding sensing units in the corresponding sensing region and a power input terminal 340 via corresponding power lines L_1-L_N.

In other words, the fingerprint sensor 300 may selectively turn on the corresponding switch components of the switch circuits 330_1-330_P through the control signals C_1-C_P according to the sensing regions where the finger is located, thereby providing a power signal to the sensing regions where the finger is located (for example, a part of the sensing regions 310_1-310_M) to perform fingerprint sensing. Therefore, the fingerprint sensor 300 of the present embodiment can selectively drive only the plurality of sensing units in partial and necessary sensing regions to perform fingerprint sensing, and therefore, can effectively shorten the fingerprint sensing time and can increase the speed of acquiring a fingerprint image.

Figure 4:
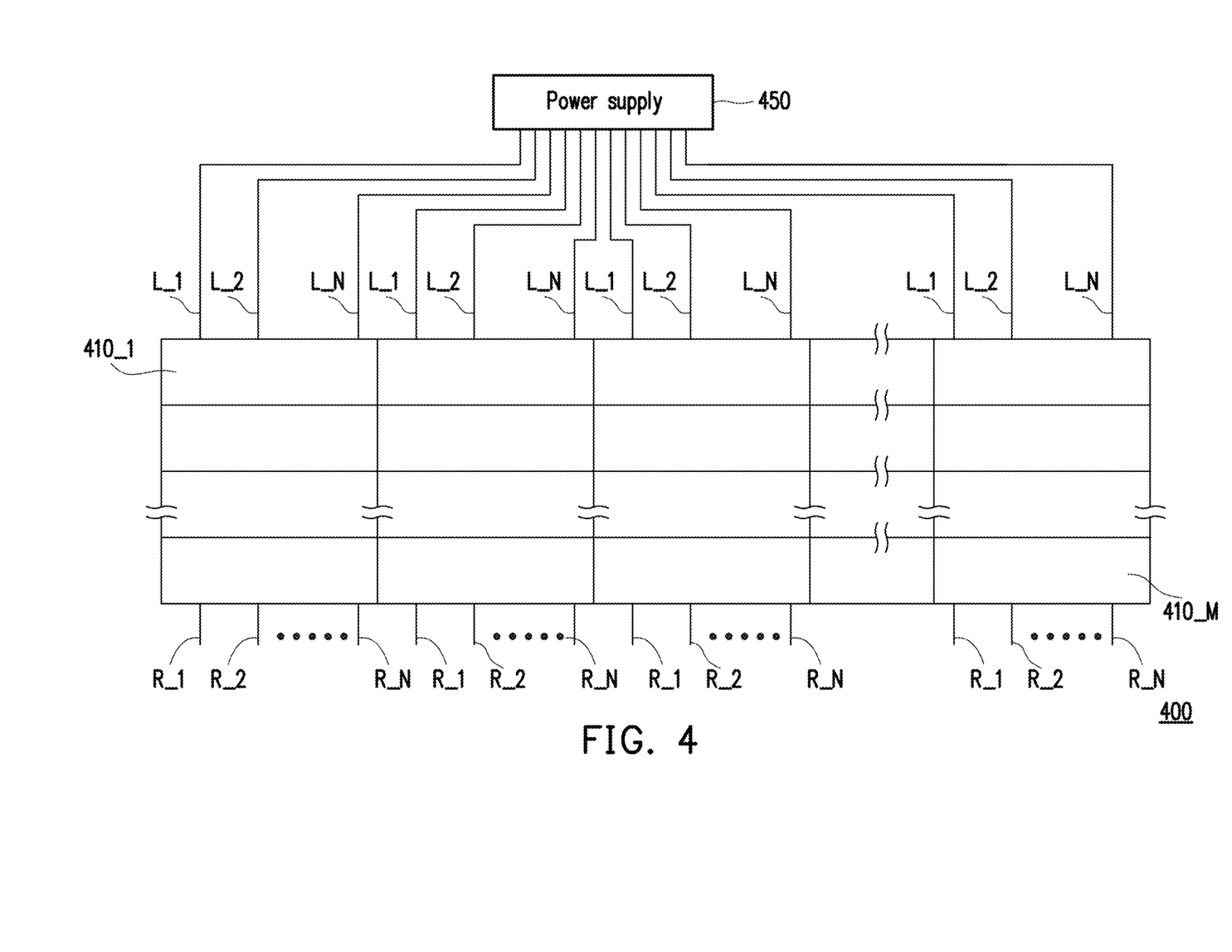
FIG. 4 shows a driving schematic diagram of a sensing array according to a third embodiment of the invention.

FIG. 4 shows a driving schematic diagram of a sensing array according to a third embodiment of the invention. With reference to FIG. 4, a fingerprint sensor 400 includes a sensing array 410 and a power supply 450. The sensing array 410 includes a plurality of sensing regions 410_1-410_M arranged in an array formed by a plurality of sensing units, and each column of the sensing regions are coupled to a readout circuit (not shown) via signal readout lines R_1-R_N. In the present embodiment, the plurality of sensing regions 410_1-410_M of the sensing array 410 are directly coupled to the power supply 450. In the present embodiment, the power supply 450 directly provides a power signal to the corresponding sensing regions (for example, a part of the sensing regions 410_1-410_M) through power lines L_1-L_N corresponding to the sensing regions where the finger is located to perform fingerprint sensing. Therefore, the fingerprint sensor 400 of the present embodiment can selectively provide the power signal to drive only the plurality of sensing units in partial and necessary sensing regions to perform fingerprint sensing, and therefore, can effectively shorten the fingerprint sensing time and can increase the speed of acquiring a fingerprint image.

Figure 5:
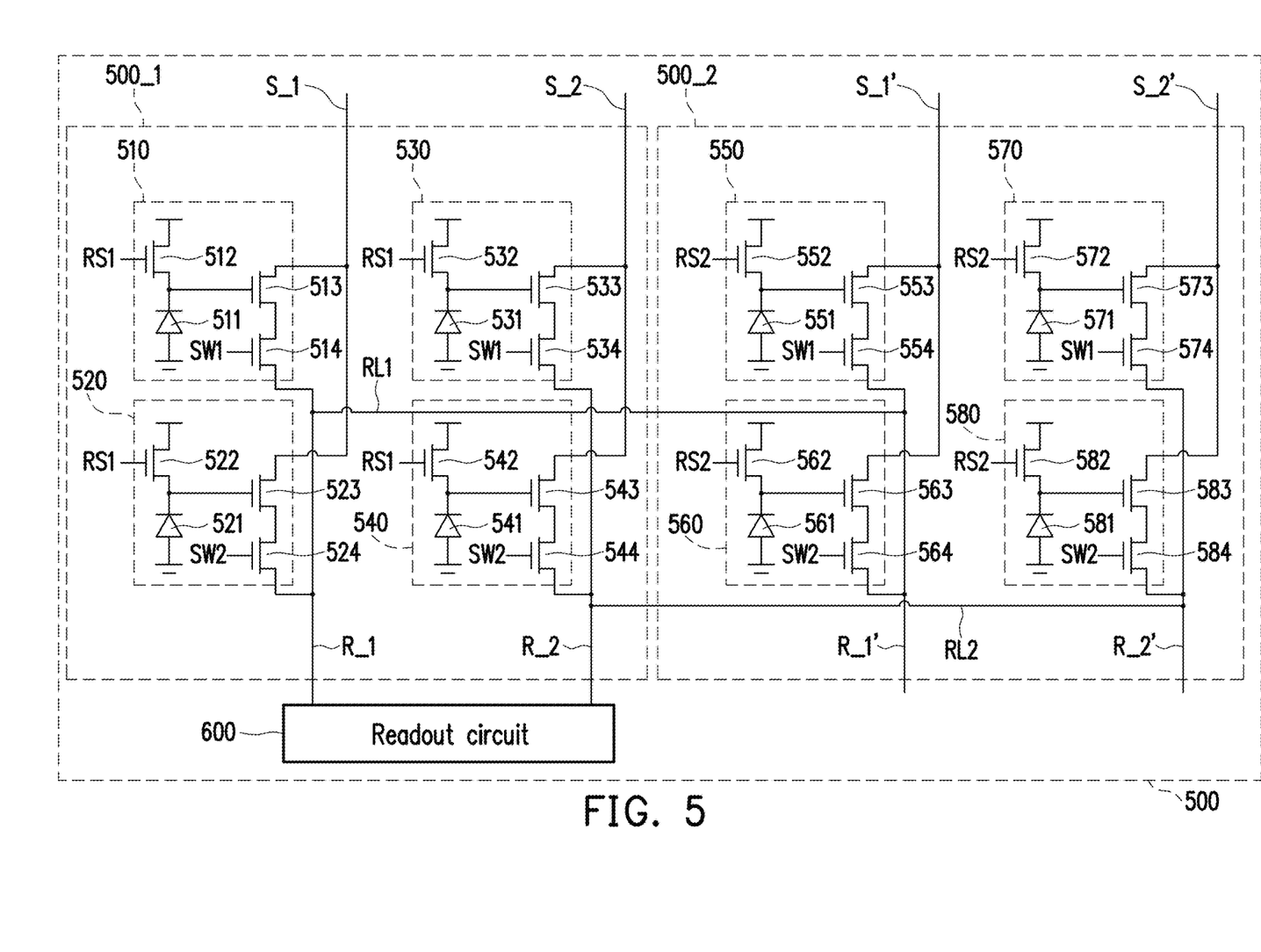
FIG. 5 shows a circuit schematic diagram of a sensing array according to an embodiment of the invention.

FIG. 5 shows a circuit schematic diagram of a sensing array according to an embodiment of the invention. With reference to FIG. 5, the present embodiment takes a sensing array 500 of two adjacent sensing regions 500_1 and 500_2 as an example, and is applicable to each sensing region and sensing unit in the embodiments of FIG. 2 to FIG. 4 described above. In the present embodiment, the sensing region 500_1 includes, for example, 2×2 sensing units 510-540, and the sensing region 500_2 includes, for example, 2×2 sensing units 550-580. The sensing unit 510 includes a photodiode 511 and transistors 512-514. A first terminal of the transistor 512 is coupled to a power input terminal, and a control terminal of the transistor 512 receives a reset signal RS1. A first terminal of the photodiode 511 is connected to ground, and a second terminal of the photodiode 511 is coupled to a second terminal of the transistor 512 and a control terminal of the transistor 513. A first terminal of the transistor 513 is coupled to a power line S_1, and a second terminal of the transistor 513 is coupled to a first terminal of the transistor 514. A control terminal of the transistor 514 receives a selection signal SW1, and a second terminal of the transistor 514 is coupled to a signal readout line R_1. By analogy, photodiodes 521, 531, 541, 551, 561, 571 and 581 and the transistors 522-524, 532-534, 542-544, 552-554, 562-564, 572-574 and 582-584 of the sensing units 520-580 have the same circuit coupling relationship.

In the present embodiment, control terminals of the transistors 512, 522, 532 and 542 of the sensing units 510-540 of the sensing region 500_1 receive the same reset signal RS1 to perform the reset synchronously. Control terminals of the transistors 552, 562, 572 and 582 of the sensing units 550-580 of the sensing region 500_2 receive a same reset signal RS2 to perform the reset synchronously. Control terminals of the transistors 514, 534, 554 and 574 of the sensing units 510, 530, 550 and 570 receive the same selection signal SW1. Control terminals of the transistors 524, 544, 564 and 584 of the sensing units 520, 540, 560 and 580 receive a same selection signal SW2. The transistors 513 and 523 of the sensing units 510 and 520 of the sensing region 500_1 are coupled to the same power line S_1, and the transistors 533 and 543 of the sensing units 530 and 540 of the sensing region 500_1 are coupled to a same power line S_2. The transistors 553 and 563 of the sensing units 550 and 560 of the sensing region 500_2 are coupled to a same power line S_1', and the transistors 573 and 583 of the sensing units 570 and 580 of the sensing region 500_2 are coupled to a same power line S_2'.

For example, when fingerprints of the user cover the sensing region 500_1 and do not cover the sensing region 500_2, the power lines S_1 and S_2 of the sensing region 500_1 are provided with the power signal, and the photodiodes 511, 521, 531 and 541 of the sensing units 510-540 perform sensing after resetting via the transistors 512, 522, 532 and 542. Next, the transistors 514, 524, 534 and 544 are turned on via the selection signals SW1 and SW2, so that a readout circuit 600 reads out sensing results of the photodiodes 511, 521, 531 and 541 of the sensing units 510-540 through the signal readout lines R_1 and R_2. In contrast, since the power lines S_1' and S_2' of the sensing region 500_2 are not provided with the power signal, no signal is output from the signal readout lines R_1' and R_2'. In other words, the readout circuit 600 of the present embodiment can obtain the fingerprint sensing results only by spending the time to read out the sensing signals transmitted by the signal readout lines R_1 and R_2, and does not need to spend additional time on the signal readout lines R_1', R_2' of the sensing region 500_2.

In addition, the $1^{st}$ column of the sensing units 510 and 520 in the sensing region 500_1 and the $1^{st}$ column of the sensing units 550 and 560 in the sensing region 500_2 are coupled to each other via a same row signal line RL1, and the $2^{nd}$ column of the sensing units 530 and 540 in the sensing region 500_1 and the $2^{nd}$ column of the sensing units 570 and 580 in the sensing region 500_2 are coupled to each other via a same row signal line RL2. Therefore, the readout circuit 600 does not need to read the sensing units of different regions through an additional multiplexer (MUX) circuit. Besides, since traces of the row signal lines RL1 and RL2 may be disposed in the sensing array 500, the fingerprint sensor to which the sensing array 500 of the present embodiment is applied can also effectively reduce the trace area of signal lines between the sensing array 500 and the readout circuit 600.

In summary, the fingerprint sensor of the invention provides a fast large-area fingerprint sensing effect by the design of selectively providing the power signal to a part of the plurality of sensing regions of the sensing array, and the fingerprint sensor of the invention further provides a function of effectively reducing the trace area of the signal lines by matching a coupling manner of the row signal lines of each corresponding column between different sensing regions.

Finally, it should be noted that the foregoing embodiments are merely used for describing the technical solutions of the invention, but are not intended to limit the invention. Although the invention is described in detail with reference to the foregoing embodiments, a person of ordinary skill in the art should understand that, modifications may still be made to the technical solutions in the foregoing embodiments, or equivalent replacements may be made to some or all of the technical features; and such modifications or replacements will not cause the essence of corresponding technical solutions to depart from the scope of the technical solutions in the embodiments of the invention.

What is claimed is:

1. A fingerprint sensor, comprising:
   a sensing array, comprising a plurality of sensing units to form a plurality of sensing regions arranged in an array, wherein each of the plurality of sensing regions comprises at least one column of sensing units; and
   a plurality of switch circuits, respectively coupled between corresponding sensing regions and a power input terminal, and respectively receiving corresponding control signals,
   wherein when a first part of the plurality of sensing regions receives a power signal, to perform fingerprint sensing, a second part of the plurality of sensing regions does not receive a power signal,
   wherein a first part of the plurality of switch circuits respectively provides the power signal provided by the power input terminal to the first part of the plurality of sensing regions according to the corresponding control signals,
   wherein each of the plurality of sensing units comprises:
      a photodiode, comprising a first terminal connected to ground;
      a first transistor, comprising a first terminal directly coupled to the power input terminal, a second terminal directly coupled to a second terminal of the photodiode and a control terminal that respectively receives a correspond reset signal;
      a second transistor, comprising a control terminal directly coupled to the second terminal of the photodiode and a first terminal coupled to the power input terminal via a corresponding switch circuit of the plurality of switch circuits; and
      a third transistor, comprising a first terminal directly coupled to a second terminal of the second transistor, a second terminal directly connected to a corresponding signal readout line and a control terminal that respectively receives a corresponding selection signal,
   wherein when the power signal is provided to the first terminal of the second transistor and when the third transistor is turned on via the corresponding selection signal, a second terminal of the third transistor outputs a sensing signal to the corresponding signal readout line,
   wherein an $N^{th}$ column of sensing units in each of the plurality of sensing regions are coupled to each other via a same row signal line that directly connects between the signal readout lines of the $N^{th}$ column of sensing units, wherein N is a positive integer greater than 1.

2. The fingerprint sensor according to claim 1, wherein each of the plurality of switch circuits comprises at least one switch component, wherein the at least one switch component is coupled in a one-to-one manner between the at least one column of sensing units of the corresponding sensing region and the power input terminal.

3. The fingerprint sensor according to claim 1, wherein each of the plurality of sensing regions comprises a plurality of columns of sensing units, and each of the plurality of switch circuits comprises one switch component, wherein the one switch component is coupled in a one-to-many manner between the plurality of columns of sensing units of the corresponding sensing region and the power input terminal.

4. The fingerprint sensor according to claim 1, wherein one of the plurality of sensing regions is coupled to a readout circuit.

5. The fingerprint sensor according to claim 1, wherein the first terminal of the second transistor of each of the plurality of sensing units in a same column is coupled to a same power line.

6. The fingerprint sensor according to claim 1, wherein the second terminal of the third transistor of each of the plurality of sensing units in a same column is coupled to a same signal readout line.

\* \* \* \* \*